(12) United States Patent
Douglas

(10) Patent No.: US 6,336,558 B1
(45) Date of Patent: *Jan. 8, 2002

(54) TRACTOR UNIT AND WHEELED TRAILER COMBINATION

(76) Inventor: Patrick Joseph Douglas, Southerlee, College Green, Castletown, Isle of Man IM9 1BE (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/202,546
(22) PCT Filed: Mar. 20, 1998
(86) PCT No.: PCT/GB98/00859
   § 371 Date: Mar. 8, 1999
   § 102(e) Date: Mar. 8, 1999
(87) PCT Pub. No.: WO98/46472
   PCT Pub. Date: Oct. 22, 1998

(30) Foreign Application Priority Data

Apr. 16, 1997 (GB) ............................................. 9707655

(51) Int. Cl.⁷ ................................................ B07B 1/49
(52) U.S. Cl. ...................... 209/421; 209/241; 209/257; 198/313
(58) Field of Search ................................. 209/420, 421, 209/235, 240, 241, 255, 257; 198/312, 313; 280/425

(56) References Cited

U.S. PATENT DOCUMENTS

| | | | |
|---|---|---|---|
| 2,928,684 A | | 3/1960 | Geiger ........................ 280/425 |
| 3,139,289 A | | 6/1964 | Richler ........................ 280/125 |
| 4,948,299 A | * | 8/1990 | Cronk, Jr. et al. ...... 209/421 X |
| 4,983,280 A | * | 1/1991 | Eriksson ................. 209/420 X |
| 5,097,610 A | * | 3/1992 | Bishop ................... 209/420 X |
| 5,234,094 A | * | 8/1993 | Weyermann et al. ... 198/517 X |
| 5,577,618 A | * | 11/1996 | Rafferty ...................... 209/421 |
| 6,098,812 A | * | 8/2000 | Douglas ................. 209/421 X |

FOREIGN PATENT DOCUMENTS

| | | | |
|---|---|---|---|
| EP | 0624690 A2 | 11/1994 | ........... E01C/19/48 |
| JP | 3-102002 | * 4/1991 | |

* cited by examiner

Primary Examiner—Tuan N. Nguyen
(74) Attorney, Agent, or Firm—Madson & Metcalf

(57) ABSTRACT

A combination of a tractor unit (10) and a wheeled trailer combination, preferably a mobile screening plant (100), in which the tractor unit (10) has endless tracks (11) to render the combination highly maneuverable, and carries an upwardly and downwardly adjustable "fifth wheel coupling" (13) which pivotally connects the forward end (115) of the screening plant (100), the latter having a wheelset (118) at its rear end, and in which the screening plant (100) has an input hopper (114), an elevator (112) for conveying material to be screened from the hopper to a screen box (117), and one or more discharge conveyors (121, 123) for discharging screened material to form one or more stockpiles of screened material.

19 Claims, 3 Drawing Sheets

TRACTOR UNIT AND WHEELED TRAILER COMBINATION

BACKGROUND OF THE INVENTION

This invention relates to a tractor unit and wheeled trailer combination.

A tractor unit can be used to propel a wheeled vehicle, such as an articulated trailer, and usually is provided with a so-called "fifth wheel" coupling, to which the forward end of the trailed vehicle is detachably coupled. In order to un-couple the vehicle, it is necessary to extend temporary support legs which support the forward end of the vehicle, and then to allow the fifth wheel coupling and the trailer coupling to be un-coupled, whereby the tractor unit can move away while leaving the trailer stationary and in a safe and stable position e.g. at an unloading bay, or parked in a trailer park.

Known fifth wheel couplings can compensate for any minor vertical misalignment between a trailer coupling and the tractor coupling, in that if the trailer coupling is too high, the fifth wheel coupling can be reversed into a receiving position below the trailer coupling, and then the forward end of the trailer can be lowered until the trailer coupling can enter a mounting socket in the fifth wheel coupling, to complete the coupling connection.

In the event that the trailer coupling is too low (by a small amount), inclined guide surfaces on the fifth wheel coupling can engage the trailer coupling and progressively raise the forward end of the trailer until the trailer coupling is able to drop into the mounting socket, again to complete the coupling connection.

However, in the event that there is substantial vertical misalignment between the trailer coupling and the fifth wheel coupling, this will usually involve some substantial manual adjustment of the height of the forward end of the trailer, by suitable adjustment of the support legs, and with care being taken that this results in the height of the trailer coupling being suitable then to allow easy engagement between the fifth wheel coupling and the trailer coupling.

BRIEF SUMMARY OF THE INVENTION

In one aspect the present invention is concerned with an improved means of mounting a fifth wheel type coupling on a tractor unit, to permit its height to be adjusted to allow easy coupling together of the tractor unit and a wheeled vehicle to be coupled therewith, and without need to carry out any adjustment in the height of the coupling end of the wheeled vehicle.

According to one aspect of the invention there is provided a tractor unit for propelling a wheeled vehicle, when the latter is coupled therewith, said tractor unit having a vehicle coupling unit, and said wheeled vehicle having a coupling for co-operation therewith, and in which the coupling unit on the tractor unit is adjustably mounted on a supporting frame of the tractor unit, so as to be capable of being adjustable in height to align itself with the height of the coupling of the wheeled vehicle when the latter is free-standing in a separated position.

By providing an adjustable-in height coupling unit on the tractor unit, the tractor unit can be manoeuvred easily, with suitable adjustment of the height of the coupling unit, so as to bring the coupling unit of the tractor and the coupling of the vehicle into close co-operation with each other, and without need for any vertical adjustment of any usual temporary support legs at the coupling end of the wheeled vehicle.

The vehicle coupling unit on the tractor unit may be a female type of coupling plate, and the co-operative coupling on the vehicle may comprise a male type of coupling.

The female type of clamping plate on the tractor unit may take the form of a "fifth wheel" type of coupling, known per se, and any suitable lifting mechanism may interconnect the coupling and the supporting frame of the tractor unit, to provide necessary upward and downward adjustment of the height of the coupling. This may comprise a hydraulically operated actuator mechanism.

Evidently, in addition to facilitating coupling together of the tractor unit and a stationary wheeled vehicle e.g. an articulated trailer, when in the parked position, the facility to adjust the height of the coupling on the tractor unit will also facilitate un-coupling. Thus, the wheeled vehicle can be manoeuvred into a required parked position e.g. in a loading bay, and then suitable temporary support legs can be extended to support the coupling end of the trailer, and then the adjustable coupling on the tractor unit can be lowered thereby allowing the tractor unit to separate from the vehicle.

It should be understood that a tractor unit according to the invention may be coupled with any type of wheeled vehicle, to propel the latter, and including articulated trailers, mobile screening plants, and other mobile equipment of the type used in quarry sites e.g. a crushing plant, a crushing and screening plant, and a discharge conveyor or elevator.

Preferably, the tractor unit has a pair of endless tracks, to provide for easy manoeuvrability, and also to improve traction when hauling a wheeled vehicle (when coupled with it) over adverse ground conditions.

The tractor unit may have a driver's cab, mounted on the support frame at any convenient point, preferably the forward end. However, the invention also includes possibility of the tractor unit being remotely controlled, via remote control from remote hand held control units and preferably by infra-red control.

In a separate aspect of the invention, a tractor unit and mobile screening plant combination is provided, and which optionally is provided with a coupling between the tractor unit and the mobile screening plant as defined in said one aspect of the invention above.

According to a further aspect of the invention, there is therefore provided a tractor unit and a mobile screening plant combination, in which the tractor unit is intended to propel the combination, and the mobile screening plant comprises a towable frame or chassis having one or more wheel sets at a rear end, and a coupling at its forward end by which it can be coupled, preferably detachably coupled, with a suitable coupling provided on the tractor unit. The screening plant is intended to screen particulate material, and having a screen box or screen grid, means for supplying bulk material thereto, and one or more discharge conveyors for discharging screened material, such discharge conveyor(s) being arranged to discharge in one or more of the following directions:

a) rearwardly of the plant
b) laterally to one side of the plant;
c) laterally to an opposite side of the plant; and
d) in all of these directions if required.

In a quarry or other environment, it is desirable to provide mobile screening plants, which can receive supplies of bulk material to be screened, eg from a tipper truck, a bucket loader, or a supply conveyor, and which can then screen the material into at least one screened fraction, although preferably more than one, and then can discharge the screened material to suitable stockpiles. In order to use up the space available for stock piling most advantageously, it will be highly desirable to provide a manoeuvrable tractor unit/ screening plant combination, and the invention, in a further aspect, seeks to achieve this objective. In particular, the length of the tractor unit, relative to the overall length of the screening plant, is small, and with a pivotal coupling at the forward end of the screening plant, and one or more wheel set at the rear end, and also with preferred arrangement of endless tracks to propel the tractor unit, a highly manoeuvrable combination is obtained. The screening plant therefore can be caused to rotate about a generally vertical axis, passing generally in the region of the axle of the wheel set, and with one or more laterally projecting discharge conveyor deployed to discharge screened material, a progressively increasing circular array of stockpiles can be formed.

Alternatively, with at least one side discharge conveyor in the deployed position, and preferably with one projecting from each side, and optionally with a so called "tail conveyor" also deployed, the tractor unit may, for some requirements, be caused to move forwardly in intermittent steps, so that the discharge end of each conveyor discharges successive stock piles, so that two or three lines of progressively increasing length of stockpiles can be formed. This allows the available space to be used most efficiently, and the manoeuvrability of the combination contributes significantly to this advantage.

The tractor unit may have a driver's cab, or may be arranged to be remotely operable, eg by radio or preferably infra red remote control.

The engine to operate the tractor unit may be provided on the chassis of the tractor unit, and may also serve as a source of motive power to operate the screening components of the screening plant. Alternatively, a power plant may be provided on the chassis or frame of the screening plant, to operate the screening components, and means may be provided also to transmit power from this power plant, eg by operating a hydraulic pump and motor combination, to provide necessary power to operate the tractor unit, which as mentioned above, preferably has a pair of endless tracks.

BRIEF DESCRIPTION OF THE DRAWINGS

A preferred embodiment of a tractor unit according to one aspect of the invention, and a tractor unit/screening plant combination according to a further aspect, will now be described in detail, by way of example, with reference to the accompanying drawings, in which.

DETAILED DESCRIPTION OF THE INVENTION

Figure 1:
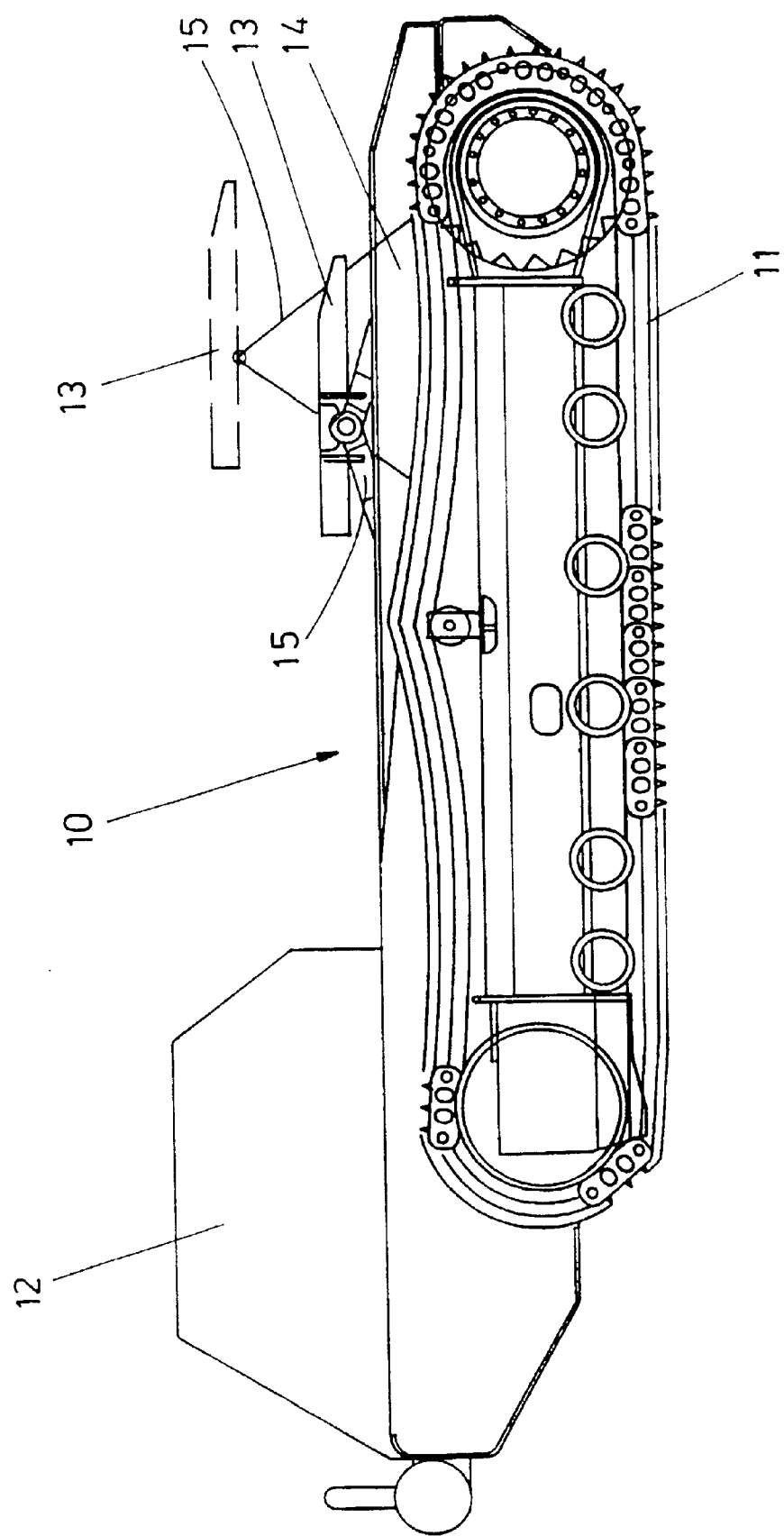
FIG. 1 is a side view of a tractor unit according to the invention.

Referring first to FIG. 1 of the drawings, there is shown a preferred embodiment of tractor unit for propelling a wheeled vehicle, when the latter is coupled therewith. The wheeled vehicle may comprise an articulated trailer, or other types of vehicle, such as mobile screening plants, or other mobile equipment of the type used in quarry installations (e.g. combined crushing and screening plant, or a discharge conveyor or elevator) or at locations where crushing, shredding, and screening operations take place e.g. in connection with site clearance work, landfill sites, and soil excavation.

The tractor unit is designated generally by reference 10 and is a self-propelled unit having its own engine and drive train. The tractor unit 10 has a pair of endless tracks 11 which give the tractor unit 10 particular manoeuvrability, and also a powerful hauling action, which is particularly useful when pulling a trailed vehicle through/over adverse ground conditions. The tractor unit 10 has a forwardly mounted housing 12, and which may house a suitable prime mover, and drive train to the endless tracks 11. The housing 12 may incorporate a driver's cab, if driver operation is required. Alternatively, or additionally, the tractor unit 10 may be arranged to be capable of remote control via a manually operated remote control unit, or via an umbilical. Preferred means of exercising remote control is via radio control.

The wheeled vehicle to be coupled with the tractor unit 10 is not shown in FIG. 1, and may comprise e.g. an articulated trailer, having a suitable male type of coupling at its forward coupling end. The tractor unit 10 has a vehicle coupling unit in the form of a female type of coupling plate 13, having a suitable mounting socket into which the male type trailer coupling can be received, in order to couple together the tractor and trailer. Preferably, the coupling 13 is effectively a "fifth wheel" type of coupling. However, by virtue of the means whereby the coupling 13 can be vertically adjusted in height, easy coupling together can take place, and any necessary manoeuvring of the tractor unit can be made, to bring the mounting socket into horizontal alignment with the trailer coupling, and with suitable final small adjustment in height of the coupling 13 to bring the two couplings into secure connection together.

The coupling plate 13 is vertically adjustably mounted on a support frame 14 of the tractor unit 10, and can be raised or lowered to any required height by operation of a suitable actuating mechanism, shown generally by reference 15, and which may be hydraulically operated mechanism. FIG. 1 shows both raised and lowered positions of the coupling plate 13.

The tractor unit 10 which is illustrated in the drawing is particularly manoeuvrable, and can be easily coupled with, and uncoupled from even very long wheeled vehicles, such as mobile screening plants of the type used in quarries, and by virtue of the manoeuvrability of the tractor unit 10 with its endless tracks 11, manoeuvring into position for coupling purposes can be easily carried out, and when coupled with a trailer vehicle, even one of great length, it can easily manoeuvre the vehicle even in relatively confined spaces.

Figure 2:
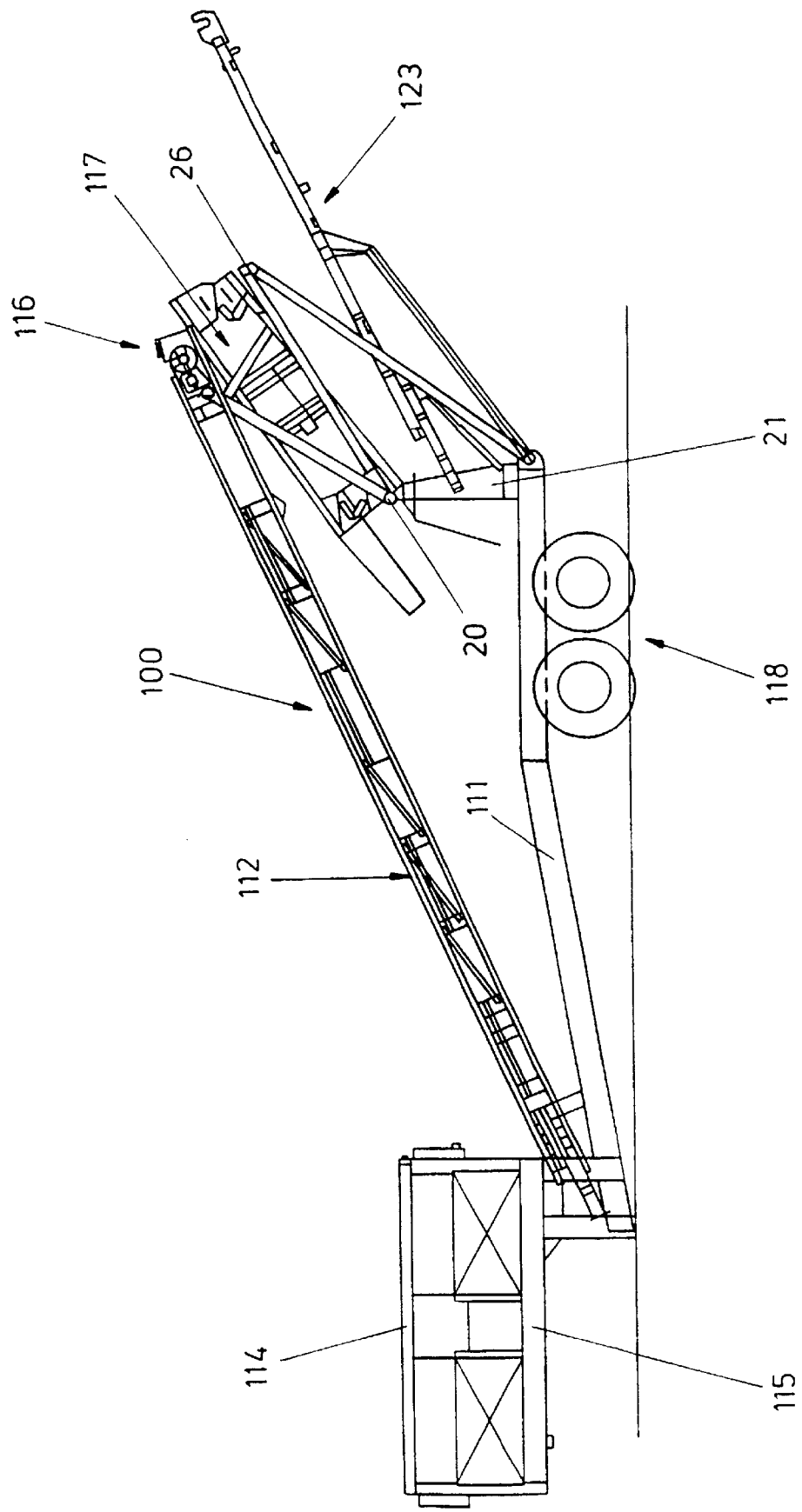
FIG. 2 is a side view of a towable screening plant which may be detachably coupled with the tractor unit, to form a tractor unit/screening plant combination according to the invention.

Referring now to FIG. 2 of the drawings, there is shown, by way of example, a typical type of towable mobile screening plant which may be coupled with the tractor unit described above with reference to FIG. 1. The screening plant is designated generally by reference 100, and is intended to screen bulk material into one or more screened fractions of particulate material, and comprises a base frame 111, an elevating conveyor 112, and a conveyor carrying frame 113 adjustably mounted on the base frame 111 and arranged so as to be capable of moving the conveyor 112 generally lengthwise in order to adjust the position of an upper end 116 of the conveyor so as to vary the region of deposition of screenable material onto a vibratory screen box 117.

The material falling under gravity from the upper discharge end 116 is received by the screen box 117, and which may have one or more screen decks, so as to screen the material into one or more different sizes of screened fractions. In the illustrated embodiment, a rear conveyor, namely a so called tail conveyor 123 is arranged to discharge screened material in a rearward direction. Although not shown, preferably the base frame 111 of the screening plant 100 mounts one, and preferably a pair of side discharge conveyors, one on each side of the frame, and which can be deployed from transport positions running alongside the length of each side of the frame, to laterally outwardly projecting positions so as to discharge screened material laterally of the plant.

Loading of the screening plant with bulk material is preferably achieved by supplying the bulk material to an input hopper/preliminary screen 114 provided at the forward end of the elevating conveyor 112.

The base frame 111 is supported at or near its rear end by a rear wheel set, and in the illustrated arrangement a tandem wheelset designated by reference 118. The forward end of the base frame 111 has suitable pivot coupling mounted thereon, preferably by way of a male pin projecting downwardly from a base 115 of the hopper 114, and which can be coupled with the fifth wheel coupling 15 of the tractor unit 10.

Figure 3:
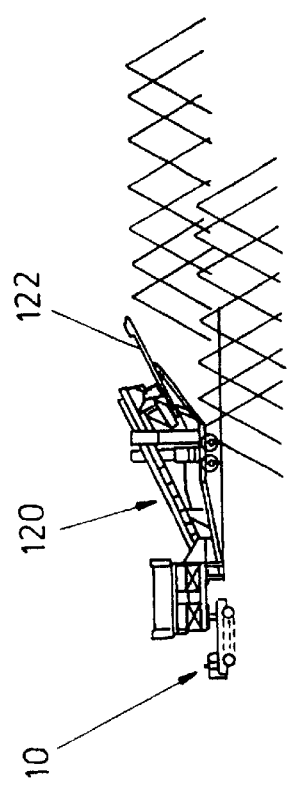
FIG. 3 is a side view showing a further embodiment of tractor unit/screening plant combination, showing possible mode of use.
Figure 4:
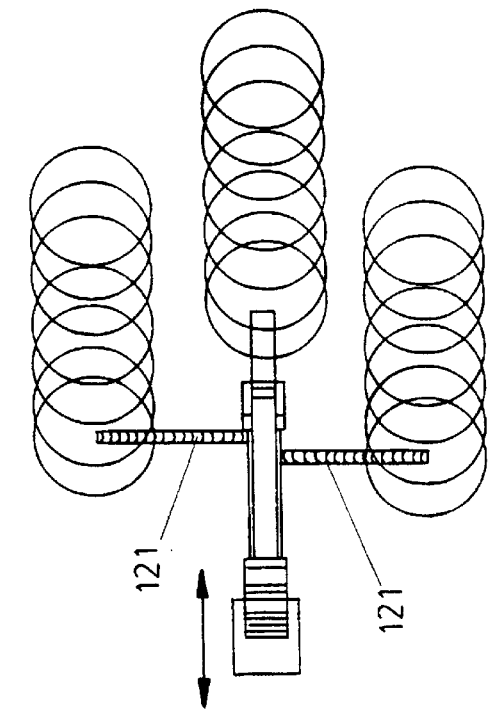
FIG. 4 is a plan view of the combination shown in FIG. 3, showing a further mode of use.

FIG. 3 shows to a reduced scale, a similar type of screening plant to that described and shown in FIG. 2, and which is designated generally by reference 120. Tractor unit 10 is coupled with the screening plant 120, and since the screening plant 120 is provided with a pair of lateral or side discharge conveyors 121 (see in particular FIG. 4), as well as a rear or tail discharge conveyor 122, this provides a range of options with regard to the discharge mode which may be required, depending on the space available. In the mode of use shown in FIG. 4, three progressively increasing lines of stockpiles can be formed, by discharge from the ends of the conveyors 121 and 122, and with step wise forward movement of the tractor unit 10, the lines of stockpiles can be progressively increased.

Figure 5:
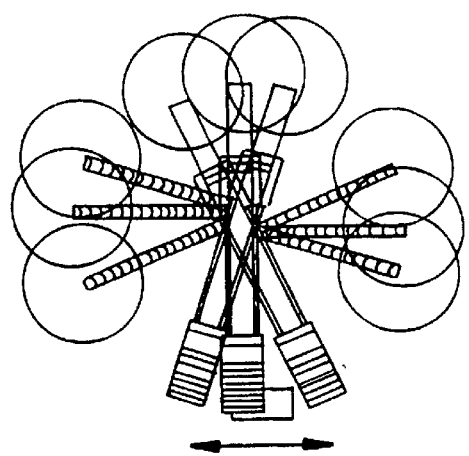
FIG. 5 is a plan view showing a still further mode of use of the combination shown in FIG. 3.

However, by virtue of the short overall length of the tractor unit 10, relative to the length of the screening plant 120, and by reason also of the pivotal coupling between the forward end of the frame of the screening plant to the coupling of the tractor unit plus the rear wheel set supporting the rear end of the screening plant, a very manoeuvrable combination is obtained. By suitable operation of the endless tracks driving the tractor unit, the trailed screening plant can be easily manoeuvred to take up any suitable discharge position (by rotation about a vertical axis passing generally through the wheel set). This is shown schematically in FIG. 5, which shows how, for example, a circular array of stock piles can be formed.

The tractor unit therefore is capable of carrying out screening and discharge of particulate material while on the move, when required, but of course also can be operated in a stationary mode when required.

What is claimed is:

1. A combination of a tractor unit and a mobile screening plant which are detachably coupled together, and in which:

the tractor unit comprises a tracked unit which is short in length relative to the length of the screening plant, and having a set of endless tracks which are operative to propel the combination, and a pivotable coupling detachably coupled with the screening plant and which is adjustable in height to facilitate coupling and uncoupling of the screening plant; and the screening plant comprises a screen box for screening bulk material into different size ranges, at least one discharge conveyor operative to discharge screened material to a discharge position spaced from the plant, and a connection at a forward end of the plant which is detachably coupled with the coupling on the tractor unit, and a wheel set supporting a rear end of the plant, whereby the combination is highly maneuverable via the pivotable coupling and relatively short length of the tractor unit so that progressively increasing stockpiles of screened material can be formed adjacent to the screening plant (a) by forward movement of the combination so as to move the discharge position of the discharge conveyor forwardly or (b) by causing the plant to pivot about an upright axis passing generally in the region of the wheel set so as to rotate the discharge position of the discharge conveyor.

2. A combination according to claim 1, in which the coupling on the tractor unit comprises a female type of coupling plate, and the connection on the screening plant comprises a male type of coupling.

3. A combination according to claim 2, in which the female type of clamping plate comprises a "5th wheel" type of coupling.

4. A combination according to claim 3, including a power-operated actuator mechanism operative to raise the 5th wheel coupling.

5. A combination according to claim 1, including means provided on the tractor unit to permit it to be remotely controlled.

6. A combination according to claim 5, in which the remote control comprises a remote hand-held control unit.

7. A combination according to claim 1, in which the discharge conveyor(s) is adjustable to permit discharge of screened material in one or more of the following directions:

(a) rearwardly of the plant;

(b) laterally to one side of the plant;

(c) laterally to an opposite side of the plant; and, (d) in all of these directions if required.

8. A combination according to claim 1, in which the screening plant has one or more wheel sets and can be caused to rotate about an upwardly extended axis, passing generally in the region of the axle of the wheelset, by suitable steering movement of the tractor unit, and in which one or more laterally projecting discharge conveyors are provided on the screening plant, operative to form a progressively increasing circular array of stockpiles of screened materials.

9. A combination according to claim 1, in which the screening plant has at least one side discharge conveyor which can be deployed to a laterally projecting position, and including a tail conveyor also mounted on the screening plant, whereby, upon forward movement of the combination, at least two lines of progressively increasing length of stockpiles can be formed.

10. A combination according to claim 1, in which the tractor unit has an engine mounted on a chassis and which also serves as a source of motive power to operate screening components of the screening plant.

11. A combination according to claim 1, in which a power plant is provided on a chassis or frame of the screening plant, and means is provided to transmit power from said power plant to operate the tractor unit.

12. A combination of a tractor unit and a mobile screening plant which are detachably coupled together, and in which:

the tractor unit comprises a tracked unit which is short in length relative to the length of the screening plant, and having a set of endless tracks which are operative to propel the combination;

a detachable pivotable coupling couples a forward end of the screening plant to the tractor unit, said coupling being adjustable in height to facilitate coupling and uncoupling of the screening plant; and the screening plant comprises a screen box for screening bulk material into different size ranges, at least one discharge conveyor operative to discharge screened material to a discharge position spaced from the plant, and a wheel set supporting a rear end of the plant, whereby the combination is highly maneuverable via the pivotable coupling and relatively short length to the tractor unit so that progressively increasing stockpiles of screened material can be formed adjacent to the screening plant (a) by forward movement of the combination so as to move the discharge position of the discharge conveyor forwardly or (b) by causing the plant to pivot about an upright axis passing generally in the region of the wheel set so as to rotate the discharge position of the discharge conveyor.

13. A combination according to claim 12, including means provided on the tractor unit to permit it to be remotely controlled.

14. A combination according to claim 12, in which the remote control comprises a remote hand-held control unit.

15. A combination according to claim 12, in which the at least one discharge conveyor is adjustable to permit discharge of screened material in one or more of the following directions:

(a) rearwardly of the plant;

(b) laterally to one side of the plant;

(c) laterally to an opposite side of the plant; and, (d) in all of these directions if required.

16. A combination according to claim 12, in which the screening plant has one or more wheel sets and can be caused to rotate about an upwardly extended axis, passing generally in the region of the axle of the wheelset, by suitable steering movement of the tractor unit, and in which one or more laterally projecting discharge conveyors are provided on the screening plant, operative to form a progressively increasing circular array of stockpiles of screened materials.

17. A combination according to claim 12, in which the screening plant has at least one side discharge conveyor which can be deployed to a laterally projecting position, and including a tail conveyor also mounted on the screening plant, whereby, upon forward movement of the combination, at least two lines of progressively increasing length of stockpiles can be formed.

18. A combination according to claim 12, in which the tractor unit has an engine mounted on a chassis and which also serves as a source of motive power to operate screening components of the screening plant.

19. A combination according to claim 12, in which a power plant is provided on a chassis or frame of the screening plant, and means is provided to transmit power from said power plant to operate the tractor unit.

* * * * *